US011313440B2

(12) United States Patent
Harvey

(10) Patent No.: US 11,313,440 B2
(45) Date of Patent: Apr. 26, 2022

(54) EPICYCLIC GEARBOX

(71) Applicant: ROLLS-ROYCE plc, London (GB)

(72) Inventor: Giles E Harvey, Derby (GB)

(73) Assignee: ROLLS-ROYCE PLC, London (GB)

(*) Notice: Subject to any disclaimer, the term of this patent is extended or adjusted under 35 U.S.C. 154(b) by 354 days.

(21) Appl. No.: 16/655,605

(22) Filed: Oct. 17, 2019

(65) Prior Publication Data

US 2020/0124139 A1    Apr. 23, 2020

(30) Foreign Application Priority Data

Oct. 23, 2018  (GB) .................................... 1817229

(51) Int. Cl.
  *F16H 1/36*    (2006.01)
  *F02C 7/32*    (2006.01)
  *F02C 7/36*    (2006.01)

(52) U.S. Cl.
  CPC ................ *F16H 1/36* (2013.01); *F02C 7/32* (2013.01); *F02C 7/36* (2013.01); *F05D 2220/323* (2013.01); *F05D 2220/76* (2013.01); *F05D 2260/40311* (2013.01)

(58) Field of Classification Search
  CPC .......... F02C 7/32; F02C 7/36; F05D 2220/76; F05D 2260/40311; F01D 15/10; F16H 1/36
  See application file for complete search history.

(56) References Cited

U.S. PATENT DOCUMENTS

| 2016/0368363 | A1 | 12/2016 | Petersen et al. | |
| 2016/0369702 | A1* | 12/2016 | Otto | ...................... F04D 25/028 |
| 2019/0085714 | A1* | 3/2019 | Zatorski | ..................... F01D 5/03 |
| 2020/0340406 | A1* | 10/2020 | Maljean | .................... F02C 7/36 |

FOREIGN PATENT DOCUMENTS

| DE | 102014218539 A1 | 3/2016 |
| EP | 2728140 A2 | 5/2014 |
| EP | 3460219 A1 | 3/2019 |

OTHER PUBLICATIONS

Feb. 27, 2020 Extended Search Report issued in European Patent Application No. 19198900.3.
Search Report of the Intellectual Property Office of the United Kingdom for GB 1817229.6 with search date of Apr. 18, 2019.

* cited by examiner

*Primary Examiner* — Todd E Manahan
*Assistant Examiner* — David P. Olynick
(74) *Attorney, Agent, or Firm* — Oliff PLC

(57) ABSTRACT

A star-configuration epicyclic gearbox is shown. It comprises a sun gear (112) for connection with a first shaft (112), a plurality of planet gears (113) intermeshed with the sun gear and located in a static carrier (114), and a ring gear (115) for connection with a second shaft (116) and which is intermeshed with the plurality of planet gears. It further comprises one or more electric machines (117) drivingly connected with a respective one of the plurality of planet gears.

5 Claims, 4 Drawing Sheets

EPICYCLIC GEARBOX

CROSS-REFERENCE TO RELATED APPLICATIONS

This application claims the benefit of United Kingdom Patent Application No. 1817229.6 filed Oct. 23, 2018, the disclosure of which is herein incorporated by reference in its entirety.

TECHNICAL FIELD

This disclosure concerns star-configuration epicyclic gearboxes.

BACKGROUND

Epicyclic gearboxes are known, and may be of various configurations. In a "star" configuration a first shaft is connected with a central sun gear, which meshes with a plurality of planet gears mounted in a stationary carrier. The planet gears mesh with a ring gear which is in turn connected with a second shaft. When operating as a reduction gearbox, the first shaft is the input and the second is the output—the reverse is true when operation as a step-up gearbox.

Such gearboxes are used in automotive and aerospace applications, primarily for torque multiplication and thus are configured as reduction gearboxes.

As will be appreciated, in both of the aforesaid sectors, hybrid drivetrains are becoming increasingly attractive, in which electric machines are combined with internal combustion engines (for example of the reciprocating type, or of the gas turbine type) to aid in reduction of fuel burn and to improve the operability of the overall propulsion system.

SUMMARY

The invention is directed to star-configuration epicyclic gearboxes and engines for aircraft incorporating the same.

In one aspect, the star-configuration epicyclic gearbox comprises:
  a sun gear for connection with a first shaft;
  a plurality of planet gears intermeshed with the sun gear and located in a static carrier;
  a ring gear for connection with a second shaft and which is intermeshed with the plurality of planet gears; and
  one or more electric machines drivingly connected with a respective one of the plurality of planet gears.

In another aspect, an engine for an aircraft comprises a fan or propeller driven by a gas turbine engine via such an epicyclic gearbox.

BRIEF DESCRIPTION OF THE DRAWINGS

Embodiments will now be described by way of example only with reference to the accompanying drawings, which are purely schematic and not to scale, and in which.

DETAILED DESCRIPTION

The following embodiments describe applications of the star-configuration epicyclic gearbox in an aero engine, i.e. one suitable for producing thrust to propel an aircraft. However, it will be appreciated that the principles described herein may find application in other system types, such as power generating gas turbines or automotive applications in which the gas turbine is replaced with a reciprocating engine for example.

Figure 1:
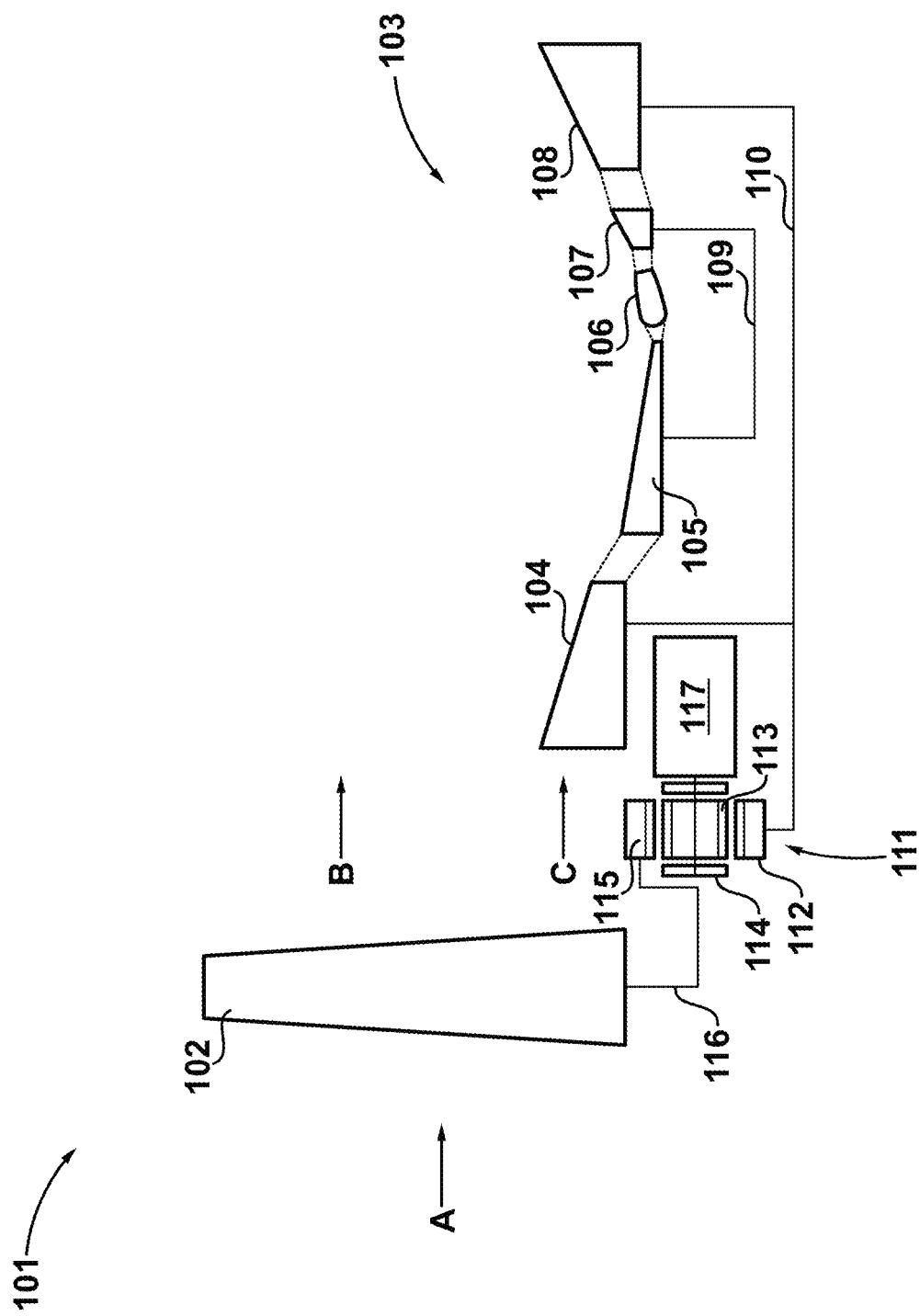
FIG. 1 shows an engine for an aircraft, incorporating a star-configuration epicyclic gearbox as set out above.

An engine 101 for an aircraft is illustrated in block-diagram form in FIG. 1.

In the present embodiment, the engine 101 is a turbofan, and thus comprises a ducted fan 102 that receives intake air A and generates two airflows: a bypass flow B which passes axially through a bypass duct (not shown) and a core flow C which enters a core gas turbine 103.

The core gas turbine 103 comprises, in axial flow series, a low-pressure compressor 104, a high-pressure compressor 105, a combustor 106, a high-pressure turbine 107, and a low-pressure turbine 108.

In use, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 by an interconnecting shaft 109, which together form a high-pressure spool. The low-pressure turbine 108 drives the low-pressure compressor 104 by an interconnecting shaft 110, which together form a low-pressure spool.

The fan 102 is driven by the low-pressure turbine 108 via a reduction gearbox in the form of a star-configuration epicyclic gearbox 111. Thus in addition to the low-pressure compressor 104, the interconnecting shaft 110 is also connected with a sun gear 112 of the gearbox 111. The sun gear 112 is meshed with a plurality of planet gears 113 located in a static carrier 114, which planet gears 113 are in turn are meshed with a ring gear 115. The ring gear 115 is connected with the fan 102 via a fan shaft 116. Thus, it will be appreciated that in normal operation, the low-pressure turbine 108 produces torque which turns the sun gear 112. The sun gear 112 drives the planet gears 113, thereby driving the ring gear 115 and the fan 102. There is no other external source of torque for driving the ring gear 115. In windmill conditions, the reverse situation will occur, with the fan 102 being driven by ram flow.

As shown in FIG. 1, in the present embodiment the gearbox 111 further comprises one or more electric machines 117 drivingly connected with a respective one of the planet gears 113. In the present embodiment, the electric machines 117 are permanent magnet-type machines, in which permanent magnets are mounted on a rotor to interact with windings in a stator. Alternatively, induction, wound field, switched-reluctance, etc. type machines could be used. In the present embodiment, the electric machines 117 are of the radial flux variety. Alternatively, axial flux configurations may be used, particularly should a shorter axial length be required for packaging purposes. A transverse flux configuration may also be contemplated.

Figure 2:
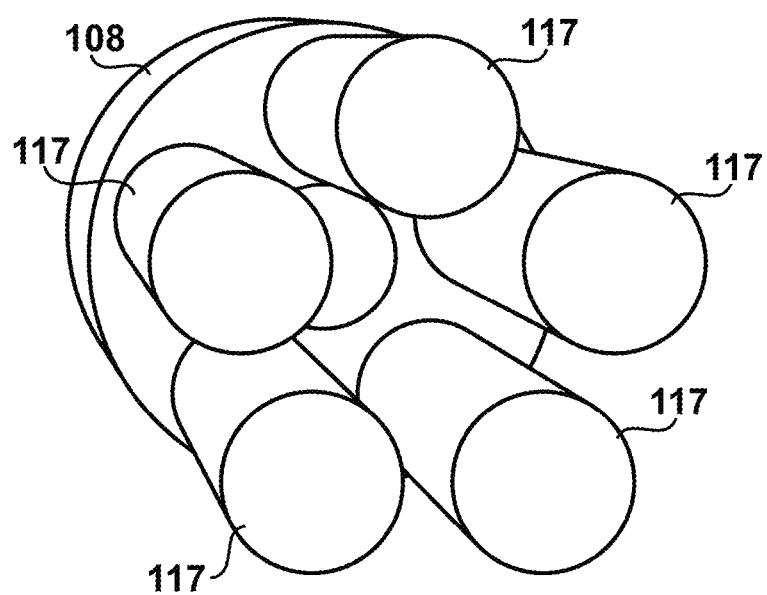
FIG. 2 shows a three-dimensional view of the carrier of the gearbox and the electric machines mounted thereto.

In an embodiment, the gearbox 111 comprises five planet gears 113, and five electric machines 117 drivingly connected with a respective one thereof. For visualisation purposes, a three-dimensional representation of this arrangement is shown in FIG. 2.

It will be appreciated however that a different number of planet gears may be provided, for example three planet gears. Furthermore, a different number of electric machines may be provided. For example, the number of planet gears 113 may remain at five, but only one electric machine 117 may be provided and be connected to only one of said five planet gears 113. Alternatively, there may be multiple electric machines 117 connected with a single one of the planet gears 113.

In the present embodiment, the electric machines 117 are configured to act as both motors and generators, i.e. they may drive and be driven by the planet gears 113. Thus in the installation of FIG. 1, the electric machines 117 may supplement the torque generated by the low-pressure turbine 108 in a motor mode of operation. They may alternatively convert mechanical work from the low-pressure turbine 108 into electrical power in a generator mode of operation.

In an alternative embodiment, the electric machines 117 are configured to only act as motors. In another alternative embodiment, the electric machines 117 are configured to only act as generators.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. In addition to, or in place of, axial stages, the low- or high-pressure compressors 104 and 105 may comprise centrifugal compression stages.

The low- and high-pressure turbines 107 and 108 may also comprise any number of stages, for example multiple stages. Each stage may comprise a row of rotor blades and a row of stator vanes. The row of rotor blades and the row of stator vanes may be axially offset from each other. Each one of the stages in each turbine co-rotates. The low-pressure spool and high-pressure spool may be configured to co-rotate or counter-rotate relative to one another.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one dimensional average enthalpy rise) across the fan 102 and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core gas turbine 103. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, the term "cruise conditions" means cruise conditions of an aircraft to which the engine 101 is installed. Such cruise conditions may be conventionally defined as the conditions at mid-cruise, for example the conditions experienced by the aircraft and/or engine at the midpoint (in terms of time and/or distance) between top of climb and start of descent.

The cruise conditions may correspond to standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having design features falling outside of the aforesaid parameter ranges.

Figure 3:
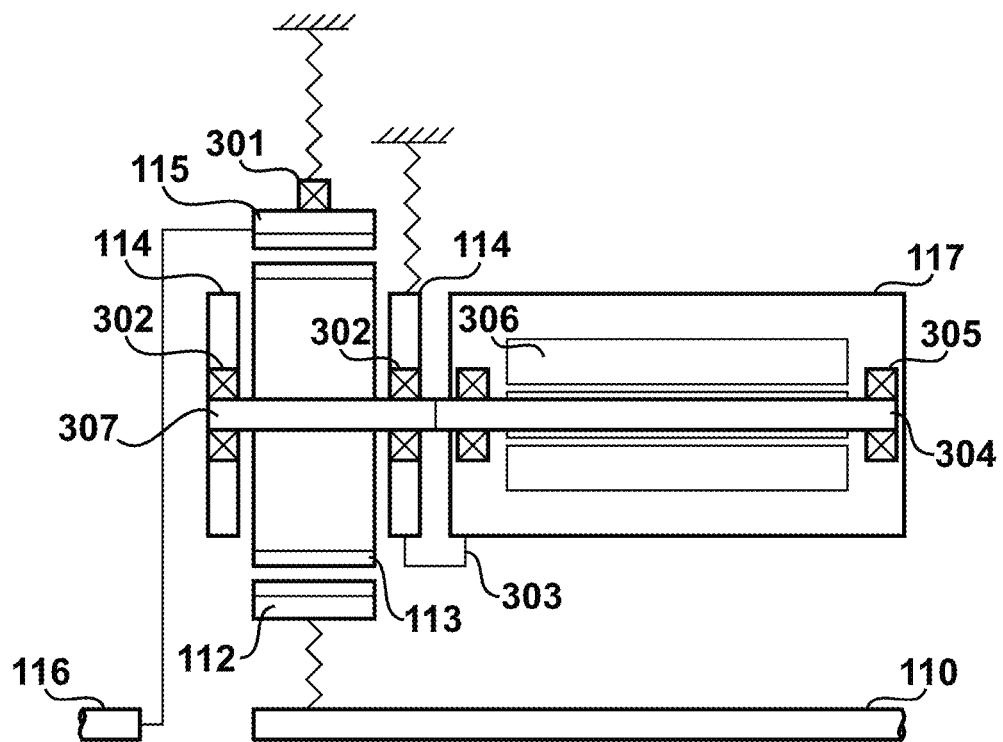
FIG. 3 shows an approach to mounting the ring gear and carrier of the gearbox in the engine and the electric machines to the carrier.

FIG. 3 is a diagram showing the connections between the gearbox 111, one electric machine 117, the shafts 110 and 116 and mechanical ground.

The sun gear 112 is connected with a first shaft, which in the present implementation in engine 101 is the shaft 110, driven by the low-pressure turbine 108.

As the gearbox 111 is a star-configuration epicyclic gearbox, the planet carrier 114 remains static relative to the rest of the structure of the engine 111. The planet gears 113 are journaled within the carrier by planet bearings 302. In the present embodiment, the planet bearings 302 are journal bearings. In alternative embodiments, they may be rolling element bearings, or they may be any other type of suitable bearing.

The ring gear 115 rotates to a second shaft, which in the present implementation in engine 101 is the fan shaft 116 for driving the fan 102. To facilitate rotation of the ring gear 115, it is journaled within a ring gear bearing 301. In the present embodiment the ring gear bearing 301 is a journal bearing, but alternatively may comprise rolling elements.

Whilst shown axially inline and radially outward of the ring gear 115 in the schematic of FIG. 3, the ring gear bearing 301 may adopt any suitable position. For example, the ring gear 115 may comprise an axially extending flange which is journaled in the ring gear bearing 301 at an axial position not in line with the mesh. Such a flange may also reduce in extent radially relative to the gear, such that the ring gear bearing 301 is located radially inward of the mesh, for example.

Furthermore, more than one ring gear bearing 301 may be provided. For example, one may be located either side of the mesh.

In the present embodiment the planet carrier 115 and ring gear bearing 301 are flexibly coupled to mechanical ground, which in the present example may be a casing or other static structure in the engine 101. Further, the sun gear 112 is flexibly coupled to the shaft 110. In this way, the gearbox 111 is isolated from external loads.

As will be appreciated, it is important for efficiency in electric machines to minimise the air gap between the rotor and stator. To facilitate this, in the present embodiment the static components of the electric machine 117 are rigidly coupled to the planet carrier 114, as indicated in the diagram by a rigid coupling 303. The electric machine includes a rotor 304 journaled in machine bearings 305 to maintain the position of the rotor 304 substantially constant relative to a stator 306 of the electric machine 117.

The rotor 304 is mechanically connected with a planet gear shaft 307, to which the planet gear is mounted. In an embodiment the rotor 304 and the planet gear shaft 307 may be integrally formed. They may alternatively be separable, with drive being transmitted by for example a splined interface or similar.

In an alternative embodiment, the machine bearings 305 may be omitted, with the planet gear bearings 302 maintaining the planet gear shaft 307 and the rotor 304 in alignment.

In the present embodiment, the rigid coupling 303 is achieved by cantilevering the static components of the electric machine 117 from the planet carrier 114. In this way, the electric machine 117 remains in alignment with the planet carrier 114 and by extension the planet gear 113. This allows the air gap to be maintained and rubs to be avoided.

As will be appreciated, electric machines may be made smaller, lighter, and more efficient if they are permitted to run at faster speeds. Furthermore, higher speed machines facilitate a reduction in diameter and thus allow a more compact installation.

It will be appreciated that in alternative embodiments, the static components of the electric machine 117 may be coupled to the static structure of the engine 101, rather than being coupled to the planet carrier 114. In such a configuration, a flexible coupling, possibly a double-diaphragm-type coupling or similar, may couple the rotor 304 to the planet gear shaft 307 so as to facilitate relative movement thereof.

In a star-configuration epicyclic gearbox such as gearbox 111, having Ns teeth on the sun gear, Np teeth on the planet gears, and Nr teeth on the ring gear, one turn of the sun gear results in −Ns/Np turns of the planets (i.e. they rotate in the opposite direction to the sun gear), and one turn of a planet gear results in Np/Nr turns of the ring gear (i.e. it rotates in the same direction as the planet gears). Thus, one turn of the sun gear results in −Ns/Nr turns of the ring gear (i.e. it rotates in the opposite direction to the sun gear) and so it is these variables that set the gear ratio.

As the gear ratio is fixed by the engine cycle design, i.e. the desired rotational speed of the low-pressure turbine 108 and the fan 102, there is a constraint on the values of Ns and Nr.

It may be shown that, in order for the centre distances of the gears to match, the number of teeth on the gears must be constrained by the relation Nr=Ns+2Np.

In the present example, at the aerodynamic design point it is desirous to rotate the fan 102 at 2300 rpm and to operate the low-pressure turbine 108 at 5600 rpm. Thus the reduction ratio of the gearbox 111 needs to be 2.33:1. In the present example, therefore, a solution to this is to set Ns to 30, Np to 20, and Nr to 70.

It will be seen therefore that the planet gears 113 will rotate 1.5 times for every rotation of the sun gear 112, i.e. at 8400 rpm. It will be appreciated that this higher angular speed is beneficial for sizing and efficiency of the electric machines 117.

Of course, depending upon the cycle design of the engine 101, different rotational speeds may be adopted for the fan 102 and the low-pressure turbine 108 as previously described, along with different reduction ratios for the gearbox 111 and different choices of tooth numbers, etc.

Figure 4:
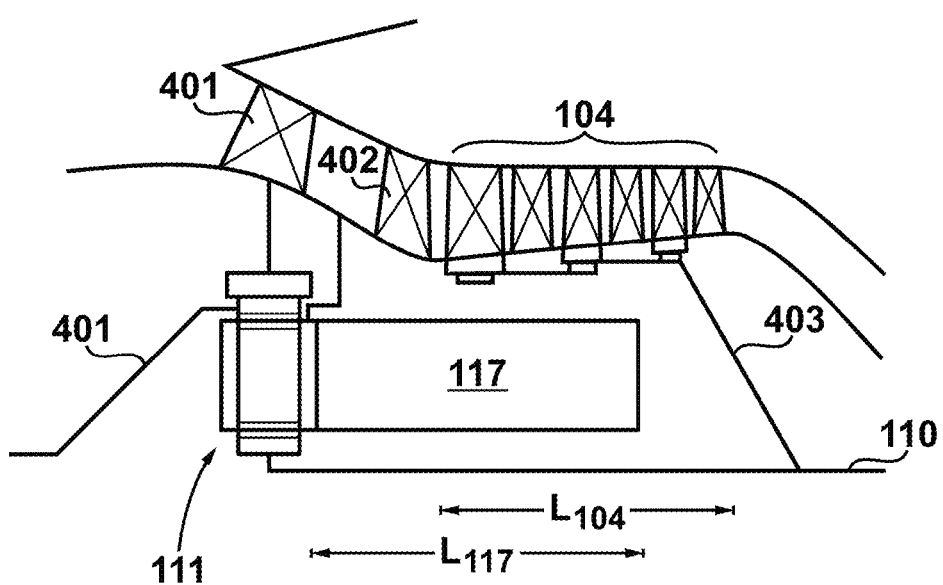
FIG. 4 shows how the gearbox and electric machines may be installed in the engine.

FIG. 4 shows the installation of the gearbox 111 and electric machine 117 in the engine 101. The low-pressure compressor 104 is shown downstream of an engine stator section vane 401 and an inlet guide vane 402. The low-pressure compressor 104 comprises in this example three stages of rotors and stators. The rotors are connected together in driving relationship for transmission of drive from the shaft 110 via a drive arm 403. As described previously, any other number of stages may be present depending upon the chosen engine design.

In this embodiment, the radial space envelope for each electric machine 117 is chosen to be the same as the diameter of the planet gears 113. Further, due to the requirement for the drive arm 403, the electric machines are limited in length such that they do not foul with the drive arm.

It will be appreciated, however, that different radial sizings of the electric machines 117 may be chosen, for example smaller or larger than that of the planet gears 113. In addition, a greater or smaller axial length may be chosen depending on the preference for the power rating of the electric machine 117, and the desire to minimise the length of the gas path of the core engine 103 so as to limit viscous losses therein.

As shown in the Figure, the electric machine 117 extends in length axially with a length $L_{117}$, whilst the low-pressure compressor 104 extends in length axially with a length $L_{104}$. A degree of overlap in an axial direction is achieved in the configuration of FIG. 4 which assists in reducing the overall length of the engine 101. In the present embodiment, there is partial overlap, however it is contemplated that full axial overlap may be implemented in alternative embodiments.

In the present embodiment the axial overlap is achieved by use of an integrally bladed ring (often referred to in the art by the portmanteau "bling") for each of the rotors of the low-pressure compressor 104. This substantially reduces the amount to which the rotors encroach upon the radially inner space in the core engine 103, and allows an optimal radial space envelope for the electric machines 117 without requiring substantially greater axial length for the overall core engine installation. In the present embodiment the integrally bladed rings are formed of a titanium metallic matrix composite. However, it will be appreciated that alternative materials may be used such as other metal matrix composites or other alloys.

In the present example, all of the rotors in the low-pressure compressor 104 are integrally bladed rings. As shown in the Figure, this allows a good degree of overlap of the compressor and the electric machines 117. However, should a shorter electric machine 117 be acceptable—or greater overall core engine length—then only some of the rotors in the low-pressure compressor 104 can be configured as integrally bladed rings.

Of course, it will be appreciated that in other embodiments either integrally bladed disks (also known as blisks) or disk-and-airfoil rotors may be used in the low-pressure compressor 104.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An engine for an aircraft comprising:
    a propulsive fan or propeller;
    a gas turbine engine comprising (i) a low-pressure spool including a low-pressure compressor connected in driven relationship with a low-pressure turbine and (ii) a high-pressure spool including a high-pressure compressor and a high-pressure turbine; and
    a star-configuration epicyclic reduction gearbox for connecting the gas turbine engine to the propulsive fan or propeller and located axially forward of the low-pressure compressor, the gearbox comprising:
    a sun gear connected in driven relationship with the low-pressure turbine,
    a plurality of planet gears intermeshed with the sun gear, which planet gears are located in a static carrier;
    a ring gear connected in driving relationship with the propulsive fan or propeller, which ring gear is intermeshed with the plurality of planet gears, and
    one or more electric machines drivingly connected with a respective one of the plurality of planet gears, the one or more electric machines partially or fully axially overlapping with rotating stages of the low-pressure compressor.

2. The engine of claim 1, wherein the rotating stages of the low-pressure compressor are comprised of an integrally bladed ring.

3. The engine of claim 1, wherein the low-pressure turbine is a multi-stage turbine, all stages of which are arranged to co-rotate.

4. The engine of claim 1, comprising the same number of electric machines as planet gears, such that each planet gear is in driving connection with a respective electric machine.

5. The engine of claim 1, wherein the or each electric machine is configured to operate in use as one or both of:
    a motor; and
    a generator.

* * * * *